(12) United States Patent
Lamprecht et al.

(10) Patent No.: US 8,183,419 B2
(45) Date of Patent: May 22, 2012

(54) LOW SULPHUR DIESEL FUEL AND AVIATION TURBINE FUEL

(75) Inventors: Delanie Lamprecht, Vanderbijlpark (ZA); Petrus Nicolaas Johannes Roets, Vanderbijlpark (ZA)

(73) Assignee: Sasol Technology (Pty) Limited, Rosebank (ZA)

( * ) Notice: Subject to any disclaimer, the term of this patent is extended or adjusted under 35 U.S.C. 154(b) by 1023 days.

(21) Appl. No.: 12/132,590

(22) Filed: Jun. 3, 2008

(65) Prior Publication Data

US 2009/0013590 A1 Jan. 15, 2009

Related U.S. Application Data

(63) Continuation of application No. 11/256,285, filed on Oct. 19, 2005, now Pat. No. 7,390,397, which is a continuation of application No. PCT/ZA2004/000041, filed on Apr. 7, 2004.

(51) Int. Cl.
*C10L 1/10* (2006.01)
(52) U.S. Cl. .................. 585/14; 44/300; 44/451; 44/452
(58) Field of Classification Search .................... 44/300, 44/451, 452; 585/14
See application file for complete search history.

(56) References Cited

U.S. PATENT DOCUMENTS

| | | | | |
|---|---|---|---|---|
| 5,766,274 A | * | 6/1998 | Wittenbrink et al. | 44/436 |
| 5,807,413 A | * | 9/1998 | Wittenbrink et al. | 44/451 |
| 5,814,109 A | * | 9/1998 | Cook et al. | 44/300 |
| 6,310,108 B1 | | 10/2001 | Bonneau et al. | |

* cited by examiner

*Primary Examiner* — Cephia D Toomer
(74) *Attorney, Agent, or Firm* — Hahn Moodley LLP; Vani Moodley, Esq.

(57) ABSTRACT

A process for the production of a synthetic low sulphur diesel fuel and a low soot emission aviation fuel is disclosed. The process includes fractionation of a Low Temperature Fischer-Tropsch feedstock into a light kerosene fraction and a heavier diesel fraction in a volumetric ratio of at least 1:2 to form the light kerosene fraction having a smoke point greater than 50 mm, a freezing point of below −47° C., a BOCLE lubricity wear scar less than 0.85 mm, and an anti-oxidant additiveless thermal stability tube deposit rating at 260° C. of less than 1 useable as a low soot emission aviation fuel and/or an aviation fuel blend stock, and the heavier diesel fraction having CFPP according to IP309 of below −5° C., a density@20° C. of at least 0.78 kg/l, and a viscosity@40° C. of above 2 cSt useable as a synthetic low sulphur diesel fuel and/or a diesel fuel blend stock.

24 Claims, 11 Drawing Sheets

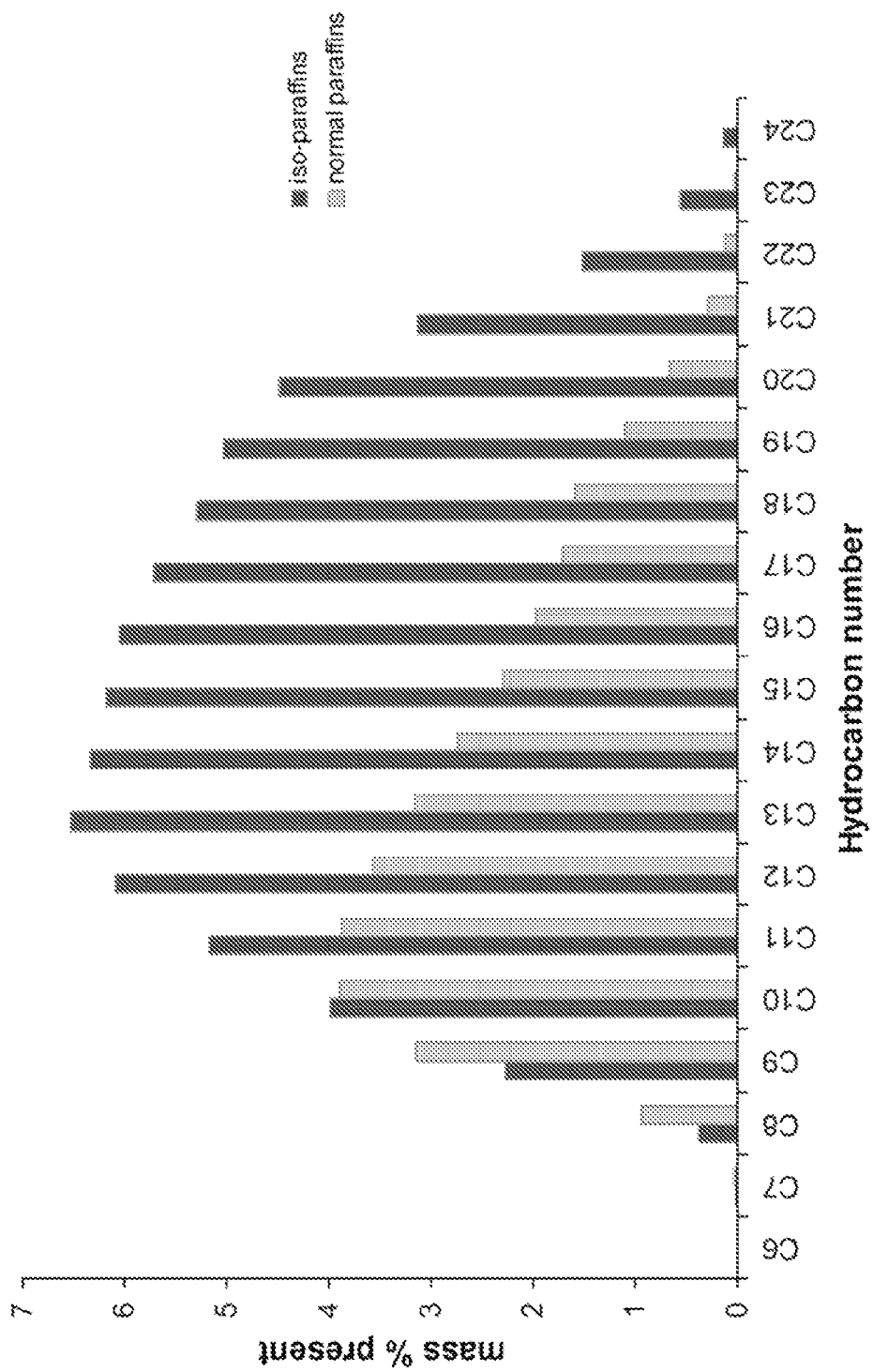
Figure 1:  Carbon distribution of Sasol SPD™ diesel

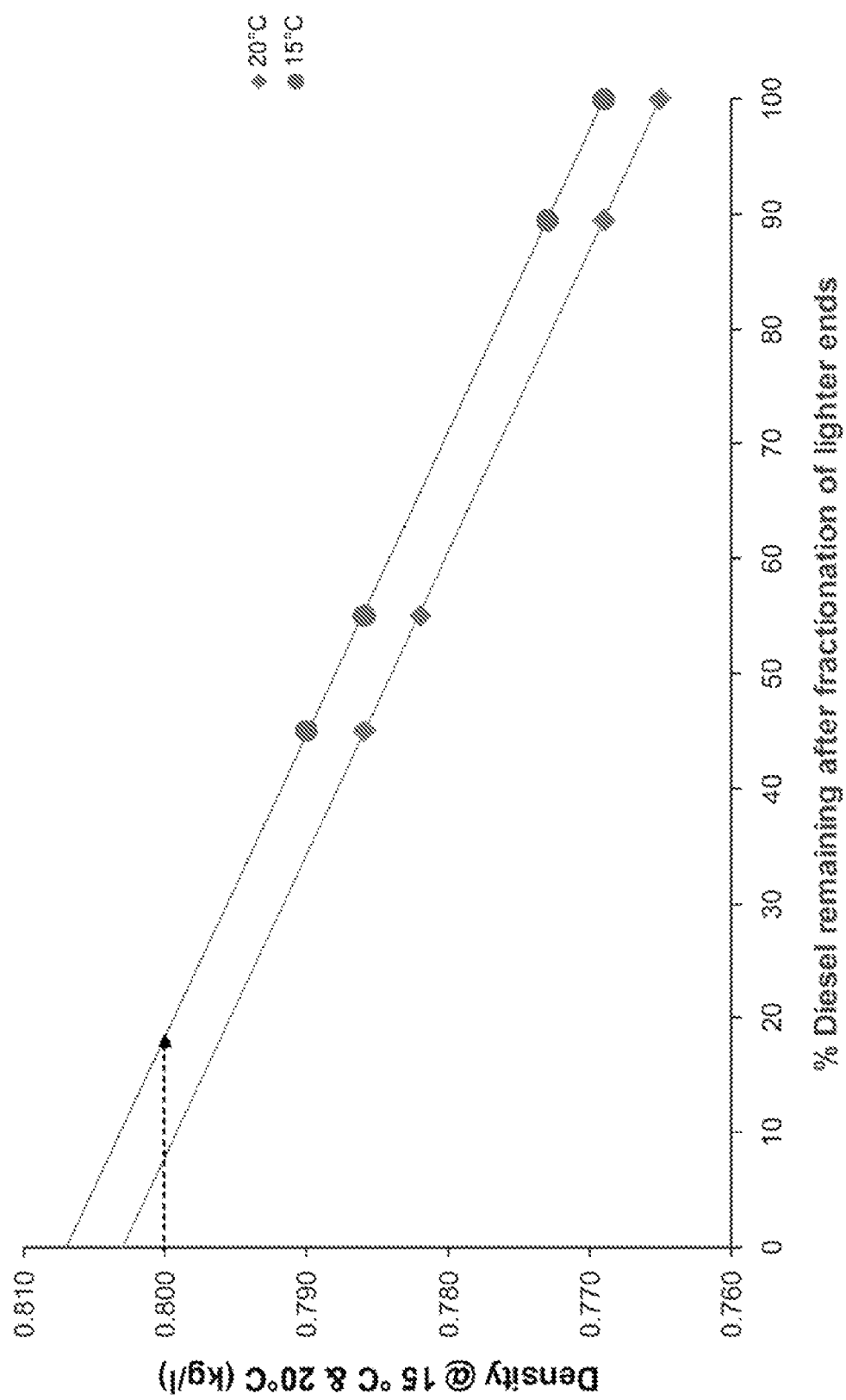
*Figure 2:* Graph of Sasol SPD™ diesel densities at various degrees of fractionation

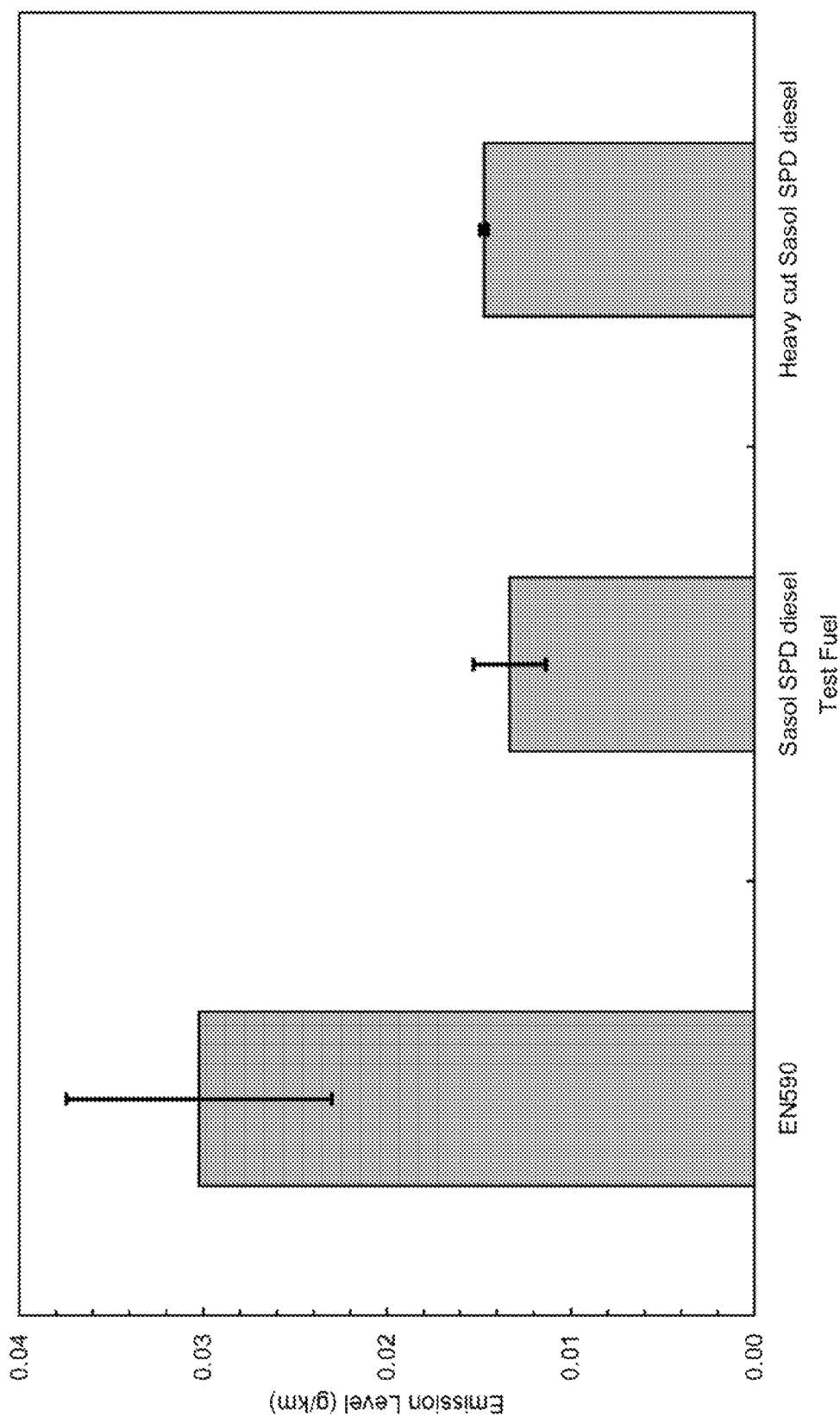
Figure 3: Composite HC Emissions

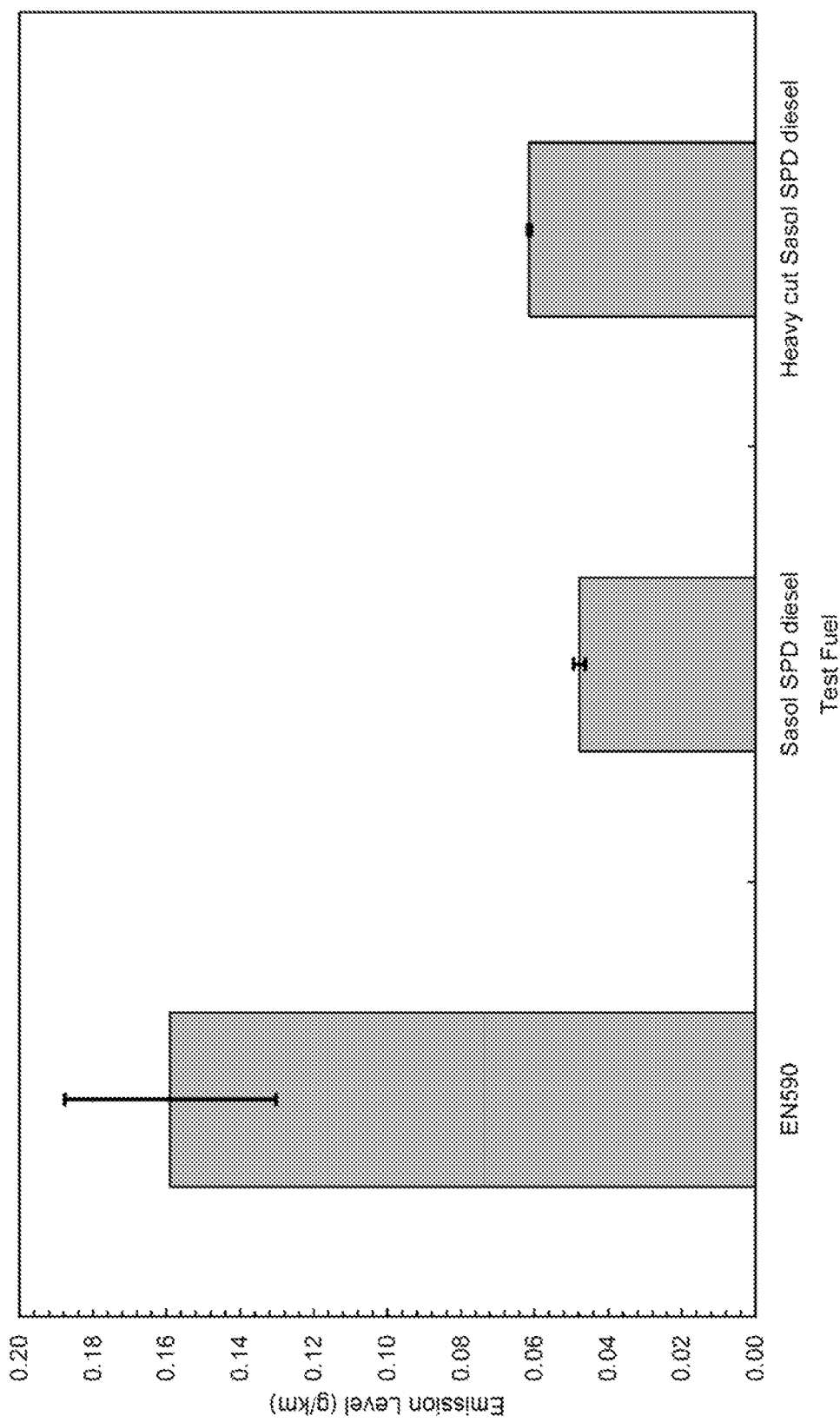
Figure 4: Composite CO Emissions

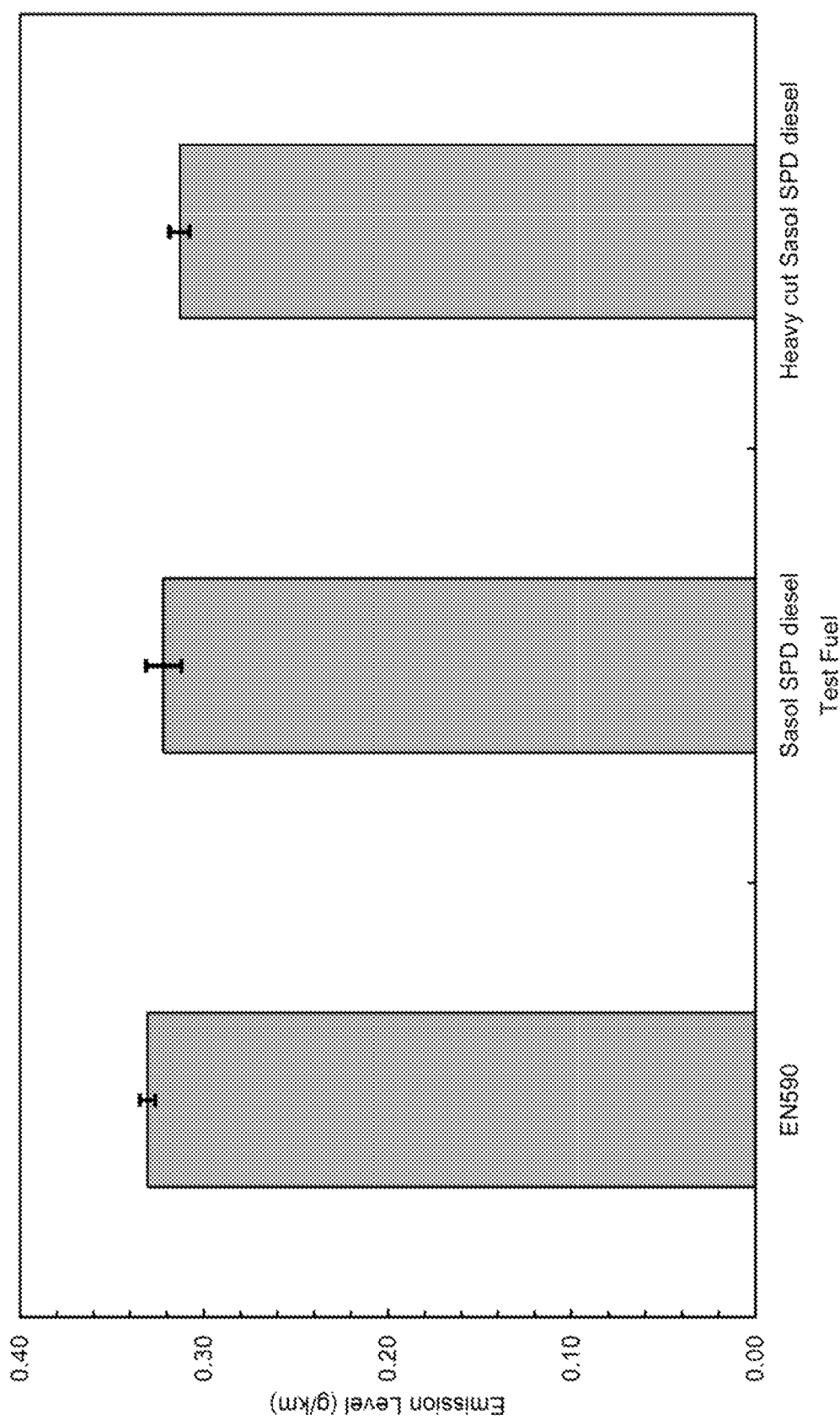
Figure 5 : Composite NOx Emissions

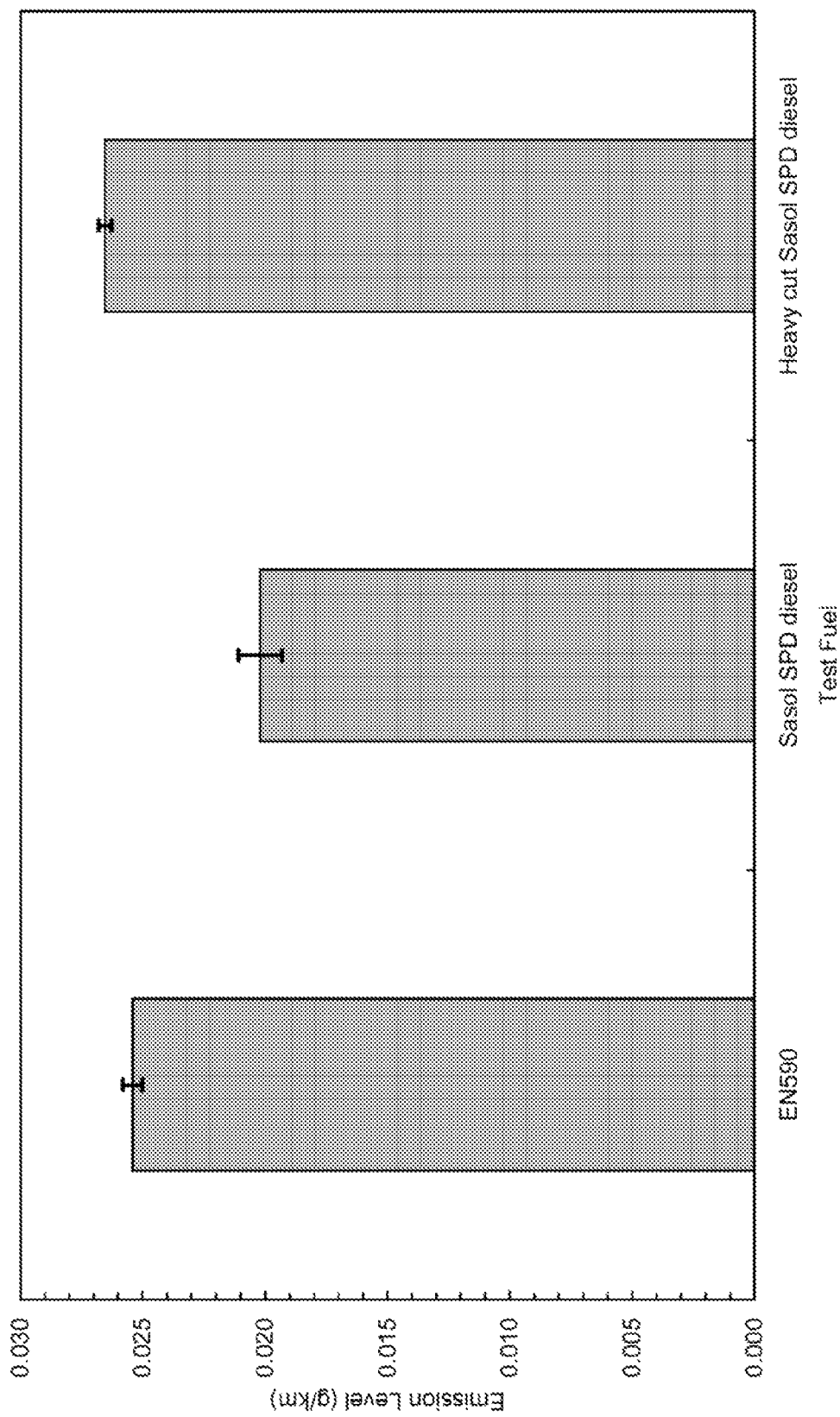
Figure 6 : Composite PM Emissions

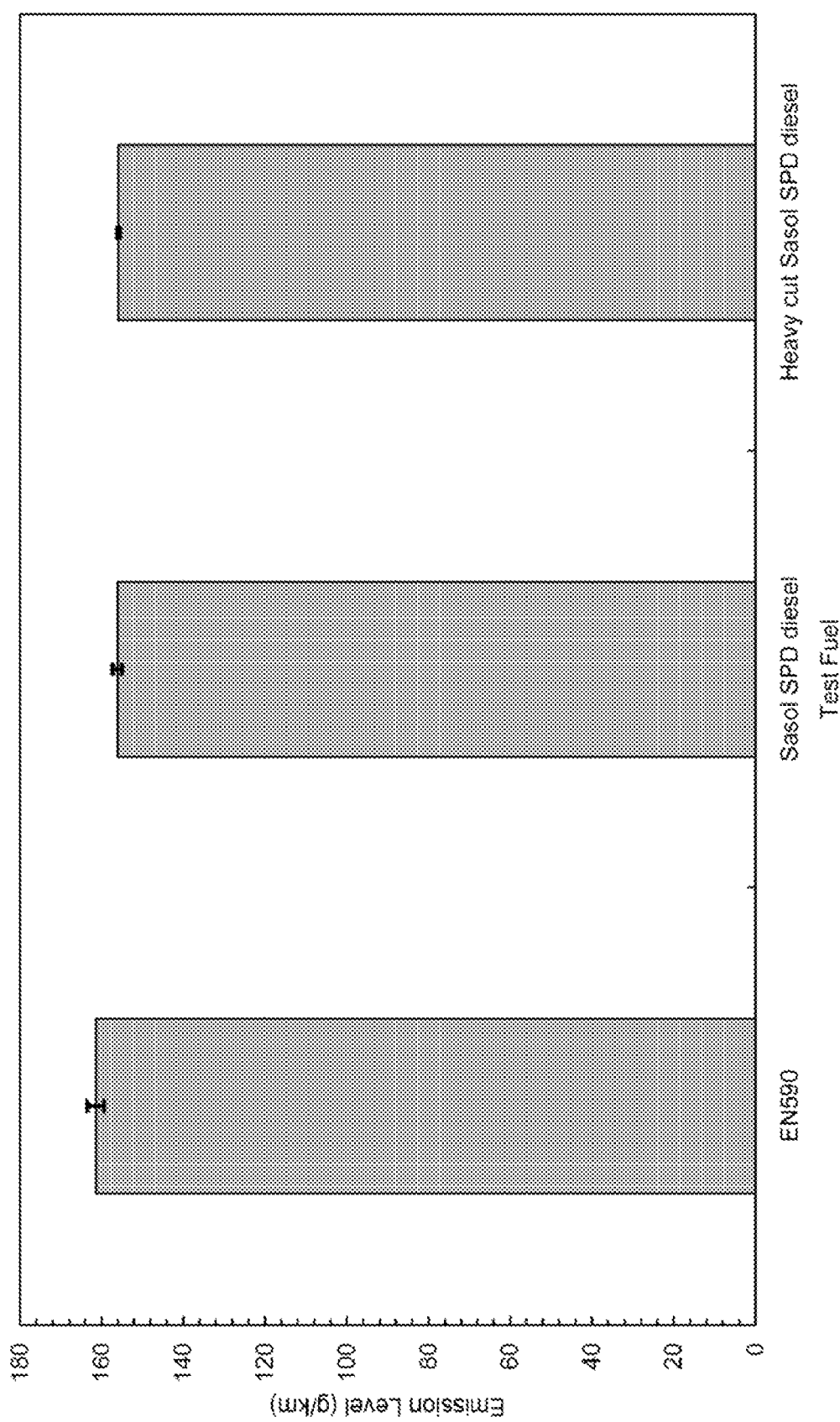
Figure 7: Composite $CO_2$ Emissions

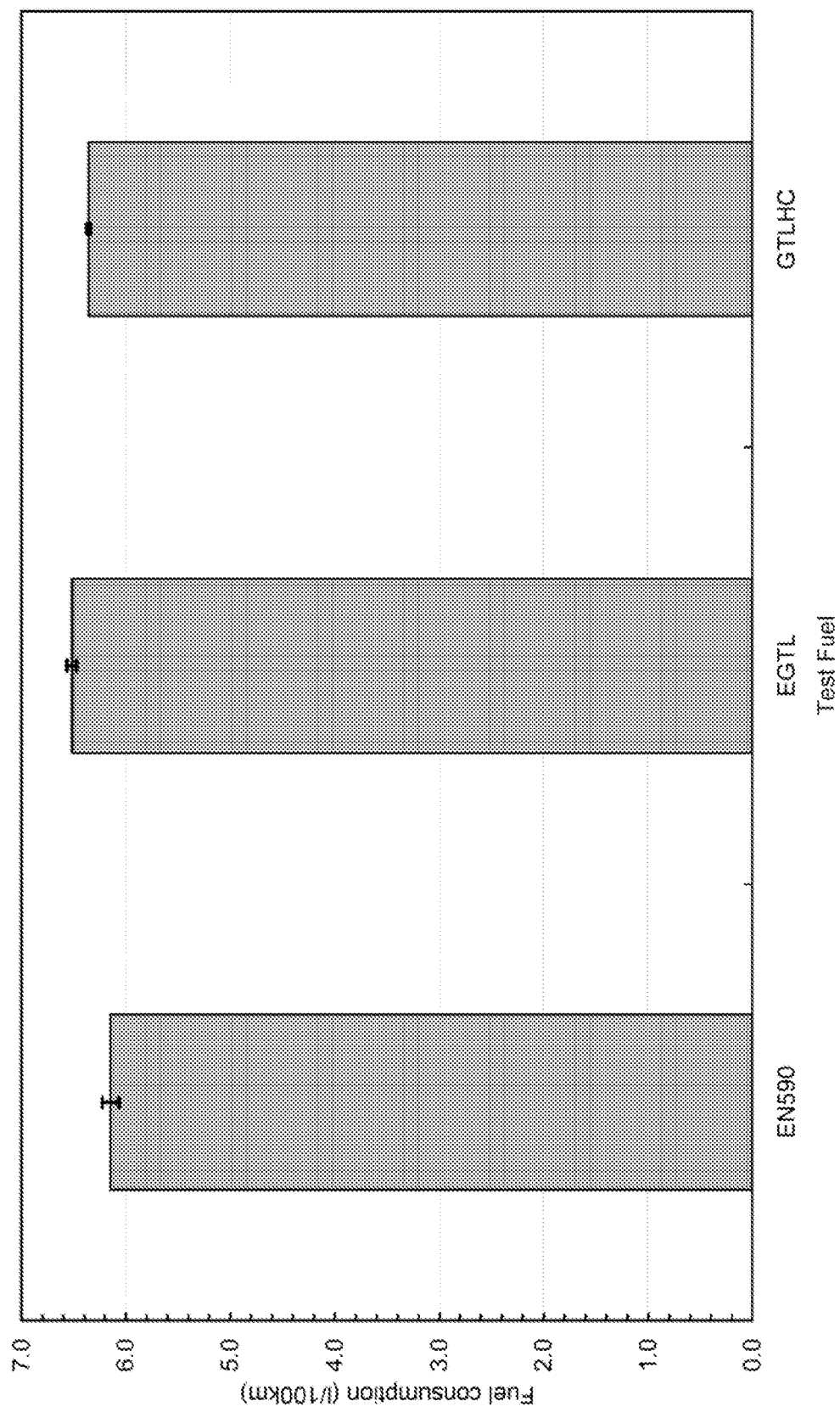
Figure 8 : Fuel Consumption

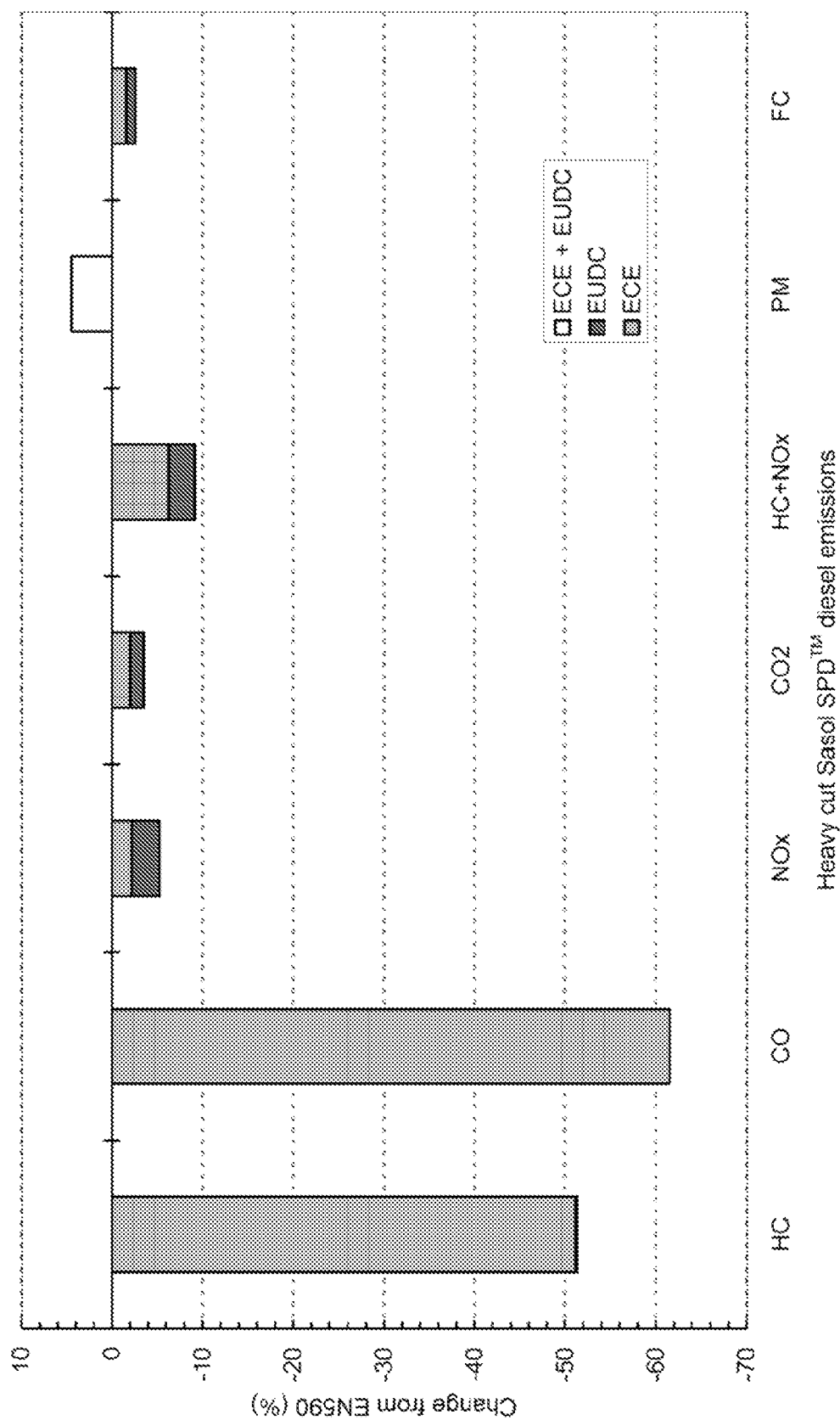
Figure 9: 55 vol-% Heavy cut Sasol SPD™ diesel emissions vs EN590

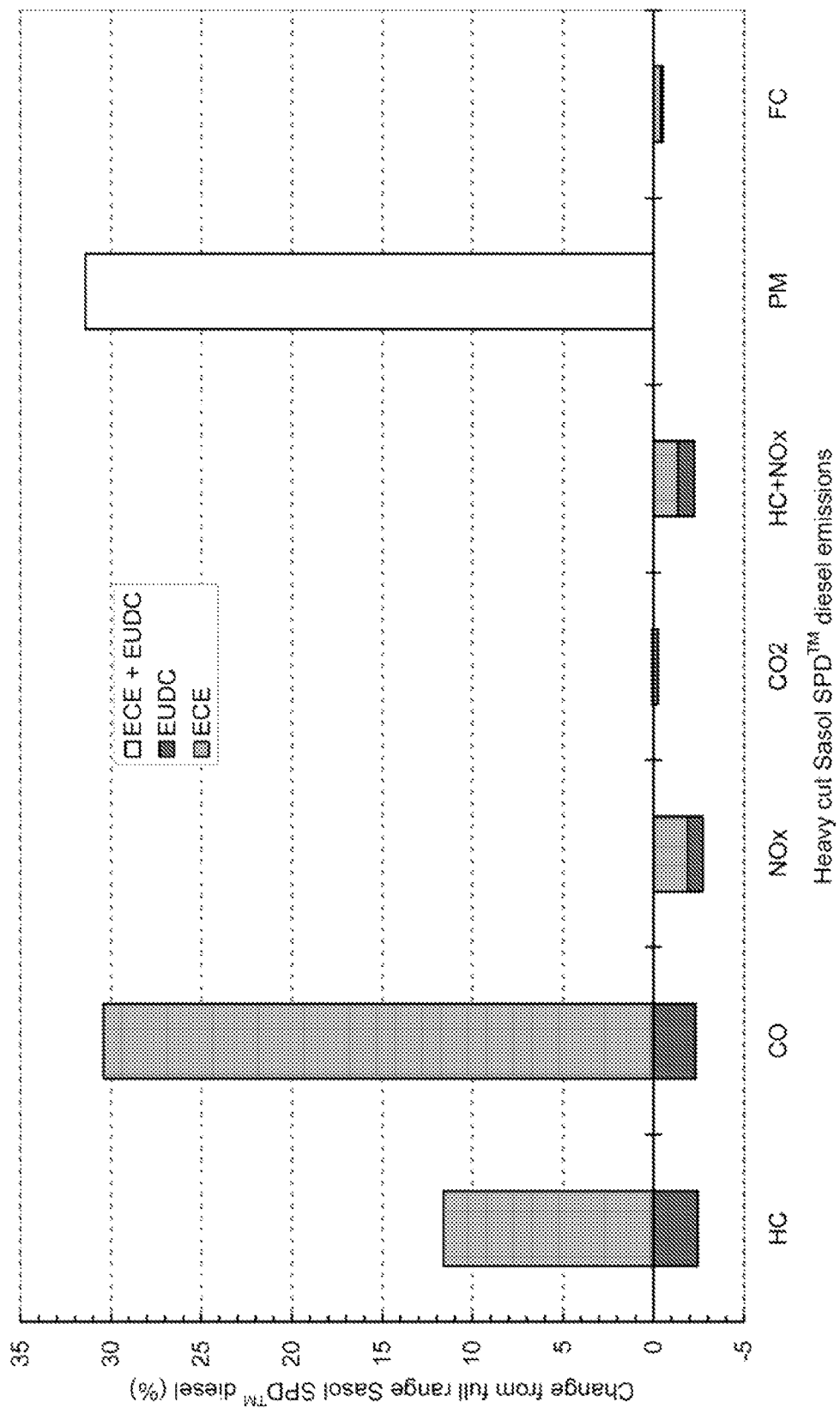
Figure 10 : 55 vol-% Heavy cut Sasol SPD™ diesel emissions vs full range Sasol SPD™ diesel

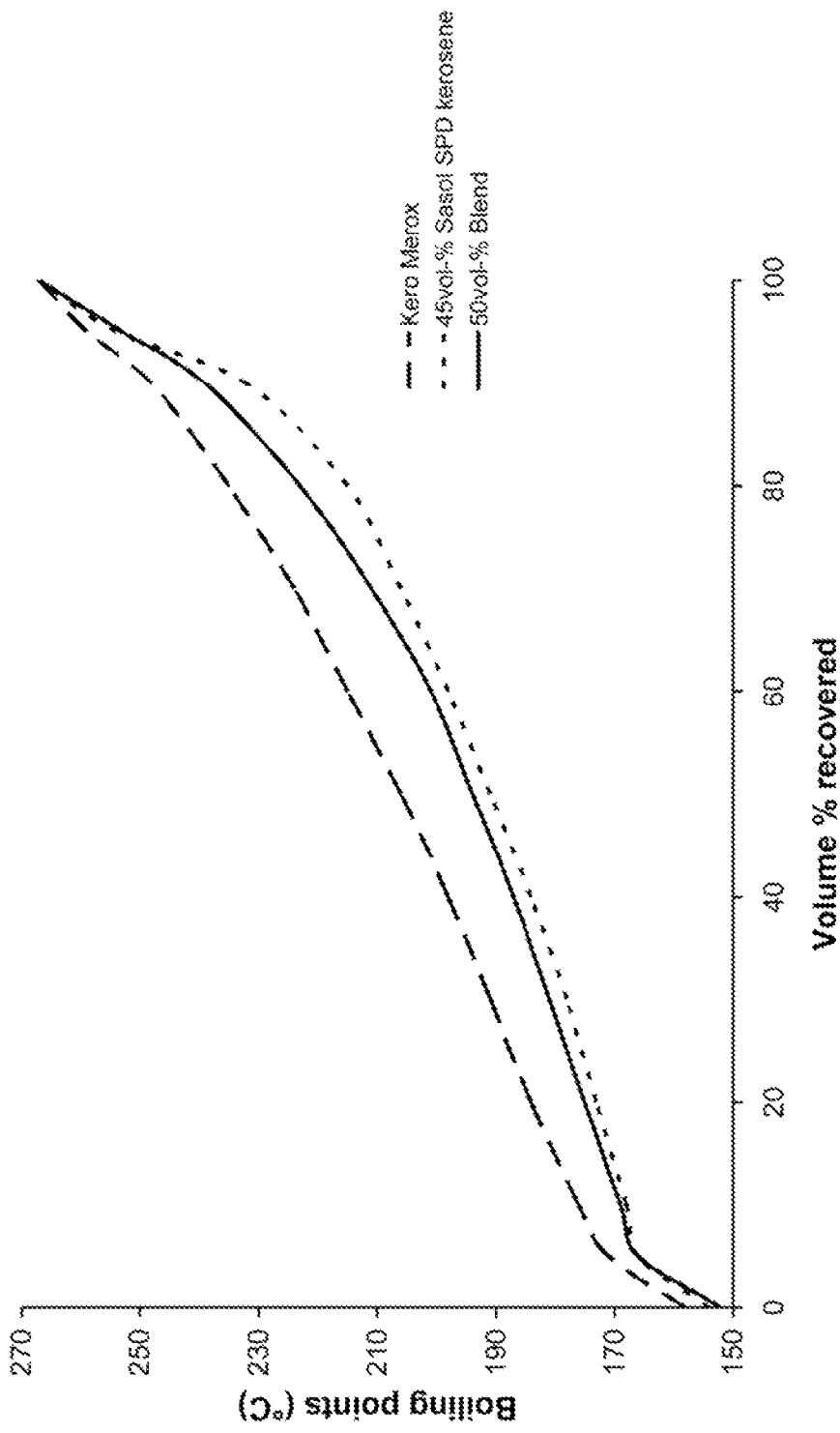
Figure 11: Distillation profiles of sweetened Kero Merox™ kerosene, the 45% Sasol SPD™ kerosene fraction and a 50% blend thereof

LOW SULPHUR DIESEL FUEL AND AVIATION TURBINE FUEL

This application is a continuation of U.S. patent application Ser. No. 11/256,285 filed Oct. 19, 2005, now U.S. Pat. No. 7,390,397 which is a continuation of International Patent Application PCT/ZA2004/000041 filed Apr. 7, 2004.

FIELD OF THE INVENTION

The invention relates to a low sulphur diesel fuel and to an aviation fuel and a blending stock for aviation fuel.

BACKGROUND TO THE INVENTION

In this specification reference is made to Low Temperature Fischer-Tropsch (LTFT) process. This LTFT process is a well known process in which carbon monoxide and hydrogen are reacted over an iron, cobalt, nickel or ruthenium containing catalyst to produce a mixture of straight and branched chain hydrocarbons ranging from methane to waxes and smaller amounts of oxygenates. This hydrocarbon synthesis process is based on the Fischer-Tropsch reaction:

$2H_2+CO \rightarrow \sim[CH_2]\sim + H_2O$ where $\sim[CH_2]\sim$ is the basic building block of the hydrocarbon product molecules.

The LTFT process is used industrially to convert synthesis gas, which may be derived from coal, natural gas, biomass or heavy oil streams, into hydrocarbons ranging from methane to species with molecular masses above 1400. While the term Gas-to-Liquid (GTL) process refers to schemes based on natural gas, i.e. methane, to obtain the synthesis gas, the quality of the synthetic products is essentially the same once the synthesis conditions and the product work-up are defined.

While the main products are linear paraffinic materials, other species such as branched paraffins, olefins and oxygenated components may form part of the product slate. The exact product slate depends on reactor configuration, operating conditions and the catalyst that is employed, as is evident from articles such as Catal. Rev. -Sci. Eng., 23 (1&2), 265-278 (1981) or Hydroc. Proc. 8, 121-124 (1982).

Preferred reactors for the production of heavier hydrocarbons are slurry bed or tubular fixed bed reactors, while operating conditions are preferably in the range of 160-280° C., in some cases in the 210-260° C. range, and 18-50 bar, in some cases preferably between 20-30 bar.

The catalyst may comprise active metals such as iron, cobalt, nickel or ruthenium. While each catalyst will give its own unique product slate, in all cases the product slate contains some waxy, highly paraffinic material which needs to be further upgraded into usable products. The LTFT products can be hydroconverted into a range of final products, such as middle distillates, naphtha, solvents, lube oil bases, etc. Such hydroconversion, which usually consists of a range of processes such as hydrocracking, hydrotreatment and distillation, can be termed a LTFT Products Work-up process. Typically the process is normally configured in such a way that only two liquid products are transferred to storage. In most instances a small amount of light hydrocarbons containing up to four carbon atoms is also co-produced. The typical quality of the LTFT liquid products is presented in Table 1.

TABLE 1

Typical Quality of the LTFT Products

|  | LTFT Naphtha | LTFT Diesel |
| --- | --- | --- |
| Density, kg/l (20° C.) | 0.685 | 0.765 |
| Distillation |  |  |
| IBP, ° C. | 54 | 151 |
| T10, ° C. | 81 | 182 |
| T50, ° C. | 101 | 249 |
| T90, ° C. | 120 | 317 |
| FBP, ° C. | 131 | 334 |
| Composition, % wt |  |  |
| n-paraffins | 59.0 | 31.9 |
| iso-paraffins | 38.2 | 67.1 |
| Naphthenics | ND | ND |
| Aromatics | 0.3 | ND |
| Olefins | 2.5 | ND |
| Oxygenates | ND | ND |
| Iso:Normal Paraffin ratio | 0.65 | 2.10 |

The applicant has identified a need to utilise LTFT fuel, including GTL fuel, directly, without blending with cracked stocks, as a fuel that will be interchangeable with conventional diesel fuels.

Semi-synthetic aviation fuel was approved in 1999 under British Aviation Turbine Fuel Defence Standard 91-91 (DEF STAN 91-91) specifications.

A need has thus been identified for a synthetic based fuel which meets or exceeds the above standards and which permits use of LTFT products, including GTL products, or components thereof in the aviation industry as fuels and/or as blend stocks for fuels.

SUMMARY OF THE INVENTION

According to a first aspect of the invention there is provided a process for the production of a synthetic low sulphur diesel fuel and an aviation fuel from a Low Temperature Fischer-Tropsch (LTFT) feedstock, said process including the fractionation of the Low Temperature Fischer-Tropsch feedstock into a light kerosene fraction useable as an aviation fuel and/or an aviation fuel blend stock, and a heavier diesel fraction useable as a synthetic low sulphur diesel fuel and/or a diesel fuel blend stock, said fractions substantially complying with diesel and aviation fuel specifications.

Surprisingly, the diesel fuel meets the lubricity specification without the use of additives, although being highly hydrogenated. Usually those skilled in the art would expect highly hydrogenated fuel to need lubricity improvers.

This has been identified as one method to increase the energy density of LTFT Fuel and also adhering to the cold flow properties (CFPP—cold filter plug point test) and lubricity specifications while producing a lighter kerosene fraction that is useable either to blend with crude oil derived blending stock to produce a semi-synthetic aviation fuel or directly as a synthetic aviation fuel.

The process includes the fractionation and removal of at least 33 volume % of the LTFT feedstock to form said aviation fuel or blending stock having a final boiling point of about 270° C.

Typically, the process includes fractionation and removal of 45 volume %, or even 55 volume % of the feedstock.

The light kerosene fraction may be cut to meet the −47° C. freezing point of Jet A-1 at a cut point of 270° C. Again the lubricity properties measured with the ball on cylinder lubricity evaluator (BOCLE) of the kerosene fraction was above expectations.

According to a second aspect of the invention, there is provided a synthetic low sulphur fuel or blend stock for a low sulphur fuel, said fuel or blend stock having the following properties:

from 13 mass % to 17 mass % hydrogen;
iso:n-paraffins mass ratio of from 2 to 5
less than 0.1% m/m aromatics;
CFPP according to IP309 of below −5° C.;
density@20° C. of at least 0.780 kg/l; and
total oxygen content less than 80 ppm.

Typically the iso:n paraffins mass ratio is from 3 to 4.

The iso:n paraffins mass ratio may be 3.7.

The hydrogen may be about 15 mass % of the fuel or blend stock.

Typically the CFPP is below −9° C.

Surprisingly, the fuel meets the lubricity specification without the use of additives, although being highly hydrogenated.

Advantageously, the emission performance was not adversely affected when compared to a crude derived low sulphur fuel even though its lighter ends is removed.

The fuel or blend stock may be a LTFT diesel fraction.

The blend stock may have viscosity@40° C. of above 2 cSt.

The fuel or blend stock may have a final boiling point of above 330° C., typically about 340° C.

The fuel or blend stock may have an IBP of above 200° C., typically above 250° C., in some embodiments in excess of 265° C.

According to a third aspect of the invention, there is provided a synthetic aviation fuel or fuel blend stock for a semi-synthetic aviation fuel, said blend stock having the following properties:

from 13 mass % to 17 mass % hydrogen;
iso:n-paraffins mass ratio of 0.5 to 3;
BOCLE lubricity wear scar less than 0.85 mm;
oxygen as oxygenates less than 50 ppm; of which
oxygen as primary C7-C12 alcohols is less than 50 ppm; and
oxygen as primary C12-C24 alcohols is less than 50 ppm.

The oxygen as oxygenates may be less than about 10 ppm.

The oxygen as primary C7-C12 alcohols may be less than about 10 ppm.

The oxygen as primary C12-C24 alcohols may be less than about 10 ppm.

The synthetic aviation fuel or fuel blend stock may have less than 0.1% m/m aromatics according to HPLC.

The synthetic aviation fuel or fuel blend stock may have a smoke point greater than 50 mm.

The synthetic aviation fuel or fuel blend stock may have a density@20° C. about 0.75 kg/l.

The synthetic aviation fuel or fuel blend stock may have a freezing point of below −47° C.;

Typically the iso:n paraffins mass ratio is from 1 to 2.

The iso:n paraffins mass ratio may be 1.2, or 1.16.

The hydrogen may be about 15 mass %.

The blend stock may be used directly as a fully synthetic aviation fuel without blending with crude derived fuel components.

The blending stock may be a LTFT kerosene fraction.

The blend stock may have viscosity@−20° C. less than 8 cSt, typically 4 cSt.

The blend stock may have a final boiling point of above 200° C., typically about 270° C.

According to a fourth aspect of the invention, there is provided a semi-synthetic aviation fuel including a blending stock as described above having the following properties:

iso:n-paraffins ratio of 0.5 to 3;
Smoke point greater than 35 mm; and
at least 8% m/m aromatics.

The semi synthetic aviation fuel may have a density@15° C. of at least 0.775 kg/l.

The semi synthetic aviation fuel may have a smoke point greater than 50 mm.

The semi synthetic aviation fuel may have a freezing point of below −47° C.;

Typically the iso:n paraffins mass ratio is from 1 to 2.

The iso:n paraffins mass ratio may be 1.8.

The blend stock may have viscosity@−20° C. of below 8 cSt, or even below 4 cSt.

With a 50 vol-% blend of LTFT kerosene and crude derived sweetened and severely hydrotreated kerosene, the minimum density and aromatic content requirements according to the American Society for Testing and Material (ASTM D1655) and the British Aviation Turbine Fuel Defence Standard 91-91 for Jet A-1 were met.

Since LTFT fuel is composed almost only of normal and isoparaffins, a LTFT kerosene fraction may be utilised as an aviation turbine fuel blending component. The virtual absence of aromatics and naphthenes from LTFT kerosene may provide it with a very good smoke point number (i.e. it produces very little soot).

According to a fifth aspect of the invention there is provided a thermally stable aviation fuel with low deposition tendency when combusted, said fuel including one or more fuel selected from a fully synthetic aviation fuel, a semi synthetic aviation fuel, and a synthetic aviation fuel blend stock, as described above.

Typically the aviation fuel and blend stock has a thermal stability tube deposit rating at 260° C. less than 1.

Typically the aviation fuel has a Quartz Crystal Microbalance (QCM) deposition less than 3 µg/cm$^2$.

More typically, the aviation fuel has QCM deposition of less than 2 µg/cm$^2$ for a 15 h QCM test @ 140° C. without addition of an anti-oxidant.

According to a sixth aspect of the invention there is provided a low soot emission aviation fuel, said fuel including one or more fuel selected from a fully synthetic aviation fuel, a semi-synthetic aviation fuel, and a synthetic aviation fuel blend stock, as described above.

Typically the aviation fuel blend stock has about a 33% reduction in the normalized particulate number density under cruise conditions, more typically a 60% reduction under cruise conditions and a 67% reduction in the normalized particulate number density under idle conditions, more typically a 83% reduction under idle conditions compared to typical conventional aviation fuel.

DESCRIPTION OF EMBODIMENTS OF THE INVENTION

The invention will now be described with reference to specific embodiments which illustrate the invention but are not intended to limit its application.

BRIEF DESCRIPTION OF THE FIGURES

FIG. 1 shows Gas Chromatograph Mass Spectrometry (GC MS) and Gas Chromatograph Flame Ionisation Detection (GC-FID) results on Sasol SPD™ diesel;

FIG. 2 shows that fractionation of Sasol SPD™ diesel results in a diesel having a higher density;

FIG. 3 shows the composite HC emissions of various fuels;

FIG. 4 shows CO emissions of various fuels;

FIG. 5 shows composite NOx emissions of various fuels;

FIG. 6 shows composite particulate matter (PM) emissions of various fuels;

FIG. 7 shows composite CO₂ emissions of various fuels;

FIG. 8 shows fuel compositions of various fuels;

FIG. 9 shows 55 vol-% heavy cut Sasol SPD™ diesel emissions vs EN590;

FIG. 10 shows 55 vol-% heavy cut Sasol SPD™ diesel emissions vs full range Sasol SPD™ diesel; and FIG. 11 shows distillation profiles of sweetened Kero Merox™ kerosene, the 45% Sasol SPD™ kerosene fraction and a 50% blend thereof.

EXAMPLES

Low Sulphur Diesel Fuel

Sasol Slurry Phase Distillate™ diesel or Sasol SPD™ diesel was fractionated targeting a freezing point requirement for Jet A-1 of −47° C. with a final boiling point of 270° C. The resultant diesel fuel properties and kerosene properties are shown in Table 2 and include density, viscosity, high-frequency reciprocating rig (HFRR) and ball-on-cylinder evaluator (BOCLE) lubricity test and cold filter plugging point (CFPP) of diesel and freezing point of kerosene.

TABLE 2

Selected fuel properties of Sasol SPD ™ diesel, the heavier diesel fraction and the lighter kerosene cut obtained through fractionation.

|  |  |  | Sasol SPD ™ Diesel | Sasol SPD ™ Diesel 1 | Sasol SPD ™ kerosene 1 | Sasol SPD ™ Diesel 2 | Sasol SPD ™ kerosene 2 |
|---|---|---|---|---|---|---|---|
| Product Yield |  | vol % | 100% | 45% | 55% | 55% | 45% |
| Density @ 15° C. | ASTM D4052 | kg/l | 0.769 | 0.790 | 0.752 | 0.786 | 0.747 |
| Density @ 20° C. | ASTM D4052 | kg/l | 0.765 | 0.786 | 0.748 | 0.782 | 0.743 |
| H₂ content | ASTM D5291 | mass % | 14.97 | 14.62 | 15.00 | 14.68 | 14.87 |
| Distillation | IBP | ° C. | 151 | 268 | 157 | 246 | 154 |
| ASTM D86 | 10% | ° C. | 182 | 282 | 172 | 262 | 168 |
|  | 50% | ° C. | 249 | 300 | 203 | 289 | 191 |
|  | 95% | ° C. | 325 | 336 | 267 | 333 | 254 |
|  | FBP | ° C. | 334 | 341 | 278 | 339 | 267 |
| Flash point | ASTM D93 | ° C. | 58 | 114 | 50 | 122 | 45 |
| Freezing point | ASTM 5901 | ° C. | −15 |  | −42 |  | −48 |
| CFPP | IP 309 | ° C. | −19 | −9 |  | −12 |  |
| Viscosity @ −20° C. | ASTM D445 | cSt |  |  | 4.26 |  | 4.17 |
| Viscosity @ 40° C. | ASTM D445 | cSt | 2.00 | 3.90 |  | 3.31 |  |
| Lubricity (HFRR) | ASTM D6079 | µm | 617 | 450 | 751 | 446 | 781 |
| Lubricity (BOCLE) | ASTM D5001 | mm |  |  | 0.81 |  | 0.83 |
| Cetane number | ASTM D613 |  | 72 | 76 |  | 75 |  |
| Gross Heating Value | ASTM D240 | MJ/kg | 46.96 | 46.55 | 47.13 | 46.97 | 47.24 |
| Net Heating Value | ASTM D240 | MJ/kg | 43.79 | 43.44 | 43.95 | 43.86 | 44.09 |
| Net Heating Value | ASTM D240 | MJ/l | 33.50 | 34.13 | 32.88 | 34.25 | 32.75 |
| Oxygen as oxygenates | GC-MS | ppm | <6 | <6 | <6 | <6 | <6 |
| Oxygen as primary C7-C12 alcohols | GC-MS | ppm | <6 | <6 | <6 | <6 | <6 |
| Oxygen as primary C12-C24 alcohols | GC-MS | ppm | <6 | <6 | <6 | <6 | <6 |
| Total oxygen | GC-TCD | ppm | <80 | <80 | <80 | <80 | <80 |

In table 2:
Sasol SPD ™ diesel is the full distillation range LTFT diesel
Sasol SPD ™ diesel 1 is a 45% heavy end LTFT diesel
Sasol SPD ™ diesel 2 is a 55% heavy end LTFT diesel
Sasol SPD ™ kerosene 1 is a 55% light end LTFT kerosene cut
Sasol SPD ™ kerosene 2 is a 45% light end LTFT kerosene cut

TABLE 3

Selected fuel properties of the Sasol SPD ™ kerosene fraction blends with crude derived sweetened and hydrotreated kerosene.

| Property | Units | Sasol SPD ™ kerosene | Kero Merox ™ kerosene | 50/50 Kero Merox blend | DHC Kerosene | 50/50 DHC kerosene blend | DEF STAN 91-91 min | DEF STAN 91-91 max |
|---|---|---|---|---|---|---|---|---|
| Total Aromatics | vol % | 0 | 19.8 | 9.9 | 12.7 | 6.5 | 8 | 25 |
| Olefins | vol % | 0 | 0 | 0 | 0 | 0 | | |
| Paraffins | vol % | 99.9 | 80.2 | 90.1 | 87.3 | 93.5 | | |
| Total Sulphur | Mass % | <0.01 | 0.14 | 0.07 | <0.01 | <0.01 | | 0.3 |
| Mercaptan Sulphur | Mass % | 0.0002 | 0.0006 | 0.0004 | 0.0005 | 0.0003 | | 0.003 |
| Doctor test | | Negative | Negative | Negative | Negative | Negative | Negative | |
| Total acid | mgKOH · g | 0.009 | 0.002 | 0.009 | <0.001 | 0.01 | | 0.015 |
| Density | | | | | | | | |
| @ 15° C. | kg/l | 0.747 | 0.809 | 0.776 | 0.820 | 0.784 | 0.775 | 0.840 |
| @ 20° C. | kg/l | 0.743 | 0.805 | 0.772 | 0.817 | 0.780 | | |
| Distillation D86 | | | | | | | | |
| IBP | ° C. | 154 | 158 | 152 | 184 | 156 | | |
| 10% | ° C. | 168 | 176 | 169 | 195 | 179 | | 205 |
| 50% | ° C. | 191 | 206 | 194 | 218 | 204 | | |
| 95% | ° C. | 254 | 259 | 253 | 274 | 268 | | |
| FBP | ° C. | 267 | 267 | 267 | 280 | 278 | | 300 |
| Flash point | ° C. | 45 | 55 | 48 | 52 | 53 | 38 | |
| Viscosity @ −20° C. | cSt | | 4.51 | 3.65 | 5.33 | 4.61 | | 8 |
| Freezing point | ° C. | −48 | −48 | −51 | −51 | −50 | | −47 |
| Lubricity (BOCLE) | mm | 0.83 | 0.48 | 0.79 | 0.68 | 0.85 | | 0.85 |
| Thermal Stability | | | | | | | | |
| Filter pressure drop | mmHg | 0 | 0 | 0 | 0 | 0 | | 25 |
| Tube deposit rating | visual | <1 | <1 | <1 | <1 | <1 | | <3 |
| Contaminants | | | | | | | | |
| Microsep without SDA | rating | 75 | 95 | 74 | 84 | 80 | 85 | |
| Water interfase rating | rating | 1b | 1b | 1b | 1b | 1b | | 1b |
| Combustion | | | | | | | | |
| Smoke point | mm | >50 | 25 | 36 | 27 | 37 | 25 | |
| Specific energy | MJ/kg | 44.09 | | | | 42.8 | | |

Diesel Fractions

The 45 vol-% heavy end diesel fraction has excellent properties for use as a neat Sasol SPD™ diesel without the use of additives A maximum wear scar diameter (WSD) of 460 μm is allowed according to the EN 590:1999 Diesel Fuel Specifications. The lubricity of the Sasol SPD™ diesel fractions with a total oxygen content less than 80 ppm increased considerably and meets the current specification requirement because of the higher viscosity of the diesel fractions, which improve the hydrodynamic lubrication without the use of a lubricity improver.

The flash points of the Sasol SPD™ diesel fractions are high because of its higher initial boiling point whereas the cold flow properties of the diesel fraction remained good.

According to Gas Chromatograph Mass Spectrometry (GC MS) and Gas Chromatograph Flame Ionisation Detection (GC-FID) results Sasol SPD™ diesel, prior to fractionation to kerosene and a diesel, has an isoparaffin to normal paraffin ratio of 2.2:1 (see FIG. 1). The 55% heavy end diesel cut has a isoparaffin to normal paraffin ratio of 3.71.

Fractionation of Sasol SPD™ diesel results in a diesel having a higher density (see FIG. 2) and energy density which results in better fuel economy or more power. It also revealed other changes after fractionation including an improvement in its lubricity, a much higher viscosity and flash point. The good cold flow properties did not decreased dramatically although the diesel fraction is much heavier.

Exhaust Emission Performance Of the Heavy Cut Diesel

The exhaust emissions of a heavy cut of Sasol SPD™ diesel fuel were compared with those of the full boiling range Sasol SPD™ diesel, as well as a European reference diesel fuel. The tests were performed using a late model European passenger car. It was found that the emission performance was not adversely affected when compared to the conventional diesel conforming to current EN590 fuel specifications, although unburned hydrocarbons, carbon monoxide, and particulate matter emissions deteriorated when compared with the full boiling range Sasol SPD™ diesel. The higher volumetric energy content of the heavy cut Sasol SPD™ diesel resulted in an improvement of 2% in the measured fuel consumption when compared to the full boiling range Sasol SPD™ diesel.

| Test vehicle | |
|---|---|
| Model: | 2002 BMW 320d sedan |
| Test Mass: | 1 474 kg |
| Engine displacement: | 1 995 cm³ |
| Bore/stroke: | 84/90 mm |
| Compression ratio: | 17:1 |
| Power output: | 110 kW @ 4000 rev/min |
| Maximum torque: | 330 Nm @ 2000 rev/min |
| Fuel injection system: | Bosch common rail |
| Exhaust aftertreatment: | Dual oxidation catalysts |
| Emission certification: | EU 3 (2000) |

Test Fuels

Three fuels were tested for the comparison:

EN590: A conventional diesel fuel meeting the European EN 590 specification, and with a sulphur content of <10 mg/kg.

Full boiling range Sasol SPD™ diesel: Sasol SPD™ diesel with an IBP of 150° C. and FBP of 335° C.

55 vol-% heavy Sasol SPD™ diesel cut: A heavy cut of Sasol SPD™ diesel, comprising of the remainder after a 45 vol-% kerosene fraction had been removed by fractionation.

Relevant fuel specifications are provided in Table 2 above:

The emission tests performed according to European EC/ECE test method, and using the NEDC test cycle. Two preconditioning runs were performed in preparation for each test. Three tests were performed with each of the EN590 and full boiling range Sasol SPD™ diesel, and two tests were performed with the 55 vol-% heavy Sasol SPD™ diesel cut. The fuels were tested sequentially, and the vehicle was warmed up and run at a speed of 120 km/h for a period of 5 minutes after each fuel change.

The results for the ECE R15 urban cycle, the EUDC highway cycle, and the combined ECE R15+EUDC cycle, are presented in Tables 4, 5, and 6 below.

TABLE 4

ECE R15 Urban Cycle Emissions and Fuel Consumption

| Fuel | | Exhaust Emissions (g/km) | | | | | FC (l/100 km) |
|---|---|---|---|---|---|---|---|
| | | CO | HC | $NO_x$ | PM | $CO_2$ | |
| EN590 | Avg. | 0.419 | 0.077 | 0.391 | Not measured | 220.4 | 8.40 |
| | Std Dev | 0.078 | 0.019 | 0.012 | | 3.611 | 0.141 |
| | COV (%) | 18.6 | 25.2 | 3.0 | | 1.6 | 1.7 |
| Full range Sasol SPD™ diesel | Avg.. | 0.113 | 0.031 | 0.388 | | 212.7 | 8.89 |
| | Std Dev. | 0.011 | 0.005 | 0.011 | | 1.246 | 0.051 |
| | COV (%) | 9.4 | 14.8 | 2.9 | | 0.06 | 0.6 |
| Heavy Sasol SPD™ diesel | Avg. | 0.152 | 0.035 | 0.371 | | 211.7 | 8.64 |
| | Std Dev | 0.003 | 0.001 | 0.000 | | 0.896 | 0.037 |
| | COV (%) | 1.7 | 3.8 | 0.1 | | 0.4 | 0.4 |

TABLE 5

EUDC Highway Cycle Emissions and Fuel Consumption

| Fuel | | Exhaust Emissions (g/km) | | | | | FC (l/100 km) |
|---|---|---|---|---|---|---|---|
| | | CO | HC | $NO_x$ | PM | $CO_2$ | |
| EN590 | Avg. | 0.008 | 0.003 | 0.295 | Not measured | 127.2 | 4.84 |
| | Std Dev | 0.001 | 0.000 | 0.001 | | 1.363 | 0.052 |
| | COV (%) | 15.6 | 12.4 | 0.4 | | 1.1 | 1.1 |
| Full range Sasol SPD™ diesel | Avg.. | 0.010 | 0.003 | 0.283 | | 123.1 | 5.14 |
| | Std Dev. | 0.004 | 0.000 | 0.008 | | 1.071 | 0.045 |
| | COV (%) | 35.3 | 10.8 | 2.9 | | 0.9 | 0.9 |
| Heavy SPD™ diesel | Avg. | 0.008 | 0.003 | 0.279 | | 123.2 | 5.03 |
| | Std Dev | 0.000 | 0.000 | 0.009 | | 0.097 | 0.004 |
| | COV (%) | 5.2 | 15.7 | 3.1 | | 0.1 | 0.1 |

TABLE 6

Composite ECE + EUDC Cycle Emissions and Fuel Consumption

| Fuel | | Exhaust Emissions (g/km) | | | | | FC (l/100 km) |
|---|---|---|---|---|---|---|---|
| | | CO | HC | $NO_x$ | PM | $CO_2$ | |
| EN590 | Avg. | 0.159 | 0.030 | 0.330 | 0.025 | 161.4 | 6.15 |
| | Std Dev | 0.029 | 0.007 | 0.004 | 0.000 | 2.064 | 0.080 |
| | COV (%) | 18.1 | 23.9 | 1.3 | 1.6 | 2.2 | 1.3 |
| Full range Sasol SPD™ diesel | Avg.. | 0.048 | 0.013 | 0.322 | 0.020 | 156.0 | 6.52 |
| | Std Dev. | 0.002 | 0.002 | 0.009 | 0.001 | 1.118 | 0.047 |
| | COV (%) | 3.3 | 14.8 | 2.9 | 4.4 | 3.0 | 0.7 |
| Heavy SPD™ diesel | Avg. | 0.061 | 0.015 | 0.313 | 0.027 | 155.8 | 6.36 |
| | Std Dev | 0.000 | 0.000 | 0.005 | 0.000 | 0.378 | 0.015 |
| | COV (%) | 0.7 | 1.3 | 1.7 | 1.0 | 1.7 | 0.2 |

The results are also presented graphically in FIGS. 3 to 8. The following may be concluded from the emission tests performed:

Use of the heavy cut of Sasol SPD™ diesel fuel did not adversely affect the exhaust emissions of the test vehicle, when compared to a European EN590 reference diesel fuel. HC and CO emissions were lower than the EN590 fuel, while NOx and particulate emissions where similar. All regulated emissions were well within the Euro 3 limits for which the test vehicle is certified.

Removing the lighter 45% of the diesel results in increases in HC, CO and PM emissions, when compared to the full boiling range diesel. While HC and CO emissions are still lower than with the EN590 reference fuel, PM emissions were similar to the EN590 fuel, and some 30% higher than the full boiling range diesel.

The increased density of the heavy cut of the Sasol SPD™ diesel results in an improvement in volumetric fuel consumption of 2%, when compared to the full boiling range diesel. Fuel consumption is still some 3% higher than with the EN590 diesel fuel, however.

Aviation Fuel

The above tables and discussion regarding the low sulphur diesel fuel refer. Viscosity and freezing point are the physical properties used to quantitatively characterise aviation fuel fluidity and only an upper viscosity limit is therefore specified for aviation fuel to which the fully synthetic Sasol SPD™ kerosene fractions conform. The light 45 vol-% Sasol SPD™ fully synthetic kerosene fraction met the required freezing point of −47° C. for Jet A-1 according to the DEF STAN 91-91 with a freezing point of −48° C. (see Table 2). The low freezing point, determined in accordance with the automated ASTM 5901 test method, is believed to be attributable to the more than 60 mass-% iso-paraffins present in the full range Sasol SPD™ diesel and more than 50 mass-% iso-paraffin present in the fully synthetic Sasol SPD™ kerosene cut.

The amount of energy contained in a given quantity of fuel is important since space comes at a premium in an aircraft. A fuel with a high volumetric energy content maximised the energy that can be stored in a fixed volume and thus provides the longest flight range. The specified net gravimetrical energy content of the Sasol SPD™ kerosene fractions are greater than the specified 42.8 MJ/kg (see Table 3).

The lubricity of the fully synthetic Sasol SPD™ kerosene cut, evaluated with the Ball-on-Cylinder Evaluator (BOCLE) (ASTM D5001 test method), has an unexpected wear scar diameter less than the maximum-wear scar diameter that is specified for Jet A-1.

Sweetened Crude Derived Kerosene Blend with Sasol SPD™ Kerosene

According to the specific approval of semi-synthetic jet fuel as Jet A-1, its aromatic content must not be less than 8 vol-%. With Sasol SPD™ diesel containing no aromatics (<0.001 mass-%), the 45 vol-% Sasol SPD™ kerosene cut was blended in a 50/50 ratio with sweetened crude derived kerosene from Merox™. The properties of the fully synthetic Sasol SPD™ kerosene as blending stock (see Table 3) and an example of sweetened kerosene, Kero Merox™, and a blend thereof are also summarised in Table 3.

The sweetened Merox treated crude derived kerosene used for the blend had a density of 0.809 kg/l @ 15° C. and the semi-synthetic blend had a boundary specified density of 0.776 kg/l @ 15° C. The aromatic content of the blend was beyond the 8 vol-% limit (see Table 3).

The composition, volatility, fluidity, water separation characteristics, lubricity and thermal stability (JFTOT) requirements for semi-synthetic jet fuel are met with up to a 50 vol-% sweetened crude derived kerosene stream—Sasol SPD™ kerosene blend. The distillation profile of the blend is shown in FIG. 11.

Synthetic kerosene blends with crude derived jet fuel have already been approved with certain limitations. These include synthetic kerosene derived solely from the Fischer-Tropsch process without the inclusion of synthetic aromatic compounds. The light Sasol SPD™ kerosene with a final boiling point of 270° C. conforms to these limitations and also to the freezing point requirement for Jet A-1 of −47° C. As a blend, its density and aromatic content will also conform to the minimum requirement of 0.775 kg/l @ 15° C. and an 8 vol-% aromatic content.

Severely Hydrotreated Crude Derived Kerosene Blend with Sasol SPD™ Kerosene

Up to 50 vol-% blends of Sasol SPD™ diesel with severely hydrotreated crude derived kerosene were also prepared to demonstrate a thermally stable semi-synthetic jet fuel conforming to Jet A-1 requirements such as freezing point, density and lubricity. The properties of a 50 vol-% blend with a severely hydrotreated kerosene, a Distillate Hydrocracked kerosene as example, is shown in Table 3.

Thermal Stability

The thermal oxidation stability of the fully synthetic aviation fuel and semi synthetic aviation fuel (blends of the light Sasol SPD™ kerosene fractions with sweetened and severely hydrotreated crude derived kerosene) were determined according to the jet fuel thermal oxidation tester (JFTOT) ASTM D3241 test method. The visual tube deposite rating for the fully as well as the semi-synthetic aviation fuel were less than 1 with no pressure drop across the filter.

Thermal stability results with the Quartz Crystal Microbalance (QCM) confirmed the JFTOT results with only 2 μg/cm$^2$ deposition observed after the 15 hour test at 140° C. without the presence of anti-oxidants.

Tests with the JP-8+100 thermal stability improving additive did not improve the stability of the synthetic aviation fuel and blends thereof since the fuel is such a low depositor.

Soot Emissions

Gas turbine engine tests results on particulates (soot) of the fully synthetic aviation fuel and blends thereof under idle and cruise conditions were compared with that of typical convention aviation fuel. The fully synthetic Sasol SPD™ light kerosene cut formed 40% less soot under cruise conditions than conventional JP-8 aviation fuel whereas a blend thereof formed 33% less soot under cruise conditions.

Under idle conditions, the Sasol SPD™ kerosene blend stock formed 83% less soot compared to typical convention aviation fuel, whereas blends thereof formed 67% less soot.

The invention claimed is:

1. A synthetic aviation fuel or fuel blend stock for a semi-synthetic aviation fuel, said aviation fuel or blend stock having the following properties:
   from 13 mass % to 17 mass % hydrogen;
   iso:n-paraffins mass ratio of 0.5 to 3;
   BOCLE lubricity wear scar less than 0.85 mm; and
   oxygen as oxygenates less than 50 ppm; of which
   oxygen as primary C7-C12 alcohols is less than 50 ppm; and
   oxygen as primary C12-C24 alcohols is less than 50 ppm.

2. A synthetic aviation fuel or fuel blend stock as claimed in claim 1, having less than 0.1% m/m aromatics.

3. A synthetic aviation fuel or fuel blend stock as claimed in claim 1, having a smoke point greater than 50 mm.

4. A synthetic aviation fuel or fuel blend stock as claimed in claim 1, having a density@20° C. about 0.75 kg/l.

5. A synthetic aviation fuel or fuel blend stock as claimed in claim 1, having a freezing point of below −47° C.

6. A synthetic aviation fuel or a fuel blend stock as claimed in claim 1, wherein the iso:nparaffins mass ratio is from 1 to 2.

7. A synthetic aviation fuel or a fuel blend stock as claimed in claim 1, wherein the iso:nparaffins mass ratio is from 1.16 to 1.2.

8. A synthetic aviation fuel or a fuel blend stock as claimed in claim 1, wherein the hydrogen is about 15 mass %.

9. A synthetic aviation fuel or a fuel blend stock as claimed in claim 1, which is a Low Temperature Fisher-Tropsch Process (LTFT) kerosene fraction.

10. A synthetic aviation fuel or a fuel blend stock as claimed in claim 1, wherein the blend stock has a viscosity@−20° C. of less than 8 cSt.

11. A synthetic aviation fuel or a fuel blend stock as claimed in claim 1, which has a final boiling point of above 200° C.

12. A semi-synthetic aviation fuel including from 0.1 mass % to 99.9 mass % of a blending stock as claimed in claim 1, said semi-synthetic aviation fuel having:
   iso:n-paraffins ratio of 0.5 to 3;
   Smoke point greater than 35 mm; and
   at least 8% m/m aromatics.

13. A semi-synthetic aviation fuel as claimed in claim 12, having a density@15° C. of at least 0.775 kg/l.

14. A semi-synthetic aviation fuel as claimed in claim 12, having a freezing point of below −47° C.

15. A semi-synthetic aviation fuel as claimed in claim 12, having an iso:nparaffins mass ratio of from 1 to 2.

16. A semi-synthetic aviation fuel as claimed in claim 15, wherein the iso:nparaffins mass ratio is 1.8.

17. A semi-synthetic aviation fuel as claimed in claim 12, including 50 vol % of the blending stock, wherein the blending stock is LTFT kerosene, and 50 volume % crude oil derived sweetened and severely hydrotreated kerosene.

18. A thermally stable aviation fuel with low deposition tendency when combusted, said fuel including one or more fuel selected from a synthetic aviation fuel, and a synthetic aviation fuel blend stock as claimed in claim 1, and another semi-synthetic aviation fuel, said thermally stable aviation fuel having a thermal stability tube deposit rating at 260° C. of less than 1.

19. A thermally stable aviation fuel as claimed in claim 18, having Quartz Crystal Microbalance (QCM) deposition of less than 3 μg/cm$^2$.

20. A thermally stable aviation fuel as claimed in claim 18, having QCM deposition of less than 2 μg/cm$^2$ for a 15 h QCM test @140° C. without addition of an anti-oxidant.

21. A synthetic aviation fuel or fuel blend stock for a semi-synthetic aviation fuel, as claimed in claim 1, wherein the oxygen as oxygenates is less than about 10 ppm.

22. A synthetic aviation fuel or fuel blend stock as claimed in claim 1, wherein the oxygen as primary C7-C12 alcohols is less than about 10 ppm.

23. A synthetic aviation fuel or fuel blend stock as claimed in claim 1, wherein the oxygen as primary C12-C14 alcohols is less than about 10 ppm.

24. A synthetic aviation fuel or a fuel blend stock as claimed in claim 11, wherein the final boiling point is about 270° C.

* * * * *